United States Patent [19]

Person

[11] 4,388,231
[45] Jun. 14, 1983

[54] PROCESS FOR EXTRACTION OF IODINE

[75] Inventor: Lucien Person, Levallois-Perret, France

[73] Assignee: Produits Chimiques Ugine Kuhlmann, Courbevoie, France

[21] Appl. No.: 115,076

[22] Filed: Jan. 24, 1980

[30] Foreign Application Priority Data

Mar. 30, 1979 [FR] France ................. 79 08004

[51] Int. Cl.³ ............... G21F 9/12; G21F 9/06
[52] U.S. Cl. ................ 252/631; 423/249; 423/501; 210/634
[58] Field of Search ............ 423/249, 501, 500; 252/631; 210/634

[56] References Cited

U.S. PATENT DOCUMENTS 2,931,777 4/1960 Shelanski ................. 252/106
3,880,619 4/1975 Richardson et al. ........... 55/71
4,013,780 3/1977 Seth ..................... 423/501

FOREIGN PATENT DOCUMENTS 17527 3/1980 European Pat. Off. ......... 423/501
2411801 7/1979 France .
40-14288 7/1965 Japan .................. 423/500

Primary Examiner—Deborah L. Kyle
Attorney, Agent, or Firm—Sigalos & Levine

[57] ABSTRACT

Process for the selective extraction of iodine from aqueous solutions containing the same, comprising utilizing as the iodine solvent a hydrophobic compound comprising ether groups, having a non-ionic character, of the type

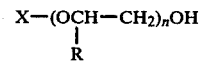

in which R is a methyl and/or ethyl group, n is a number from 1 to 200, and X is the remainder of an hydropholic compound which comprises at least one reactive hydrogen atom.

8 Claims, No Drawings

PROCESS FOR EXTRACTION OF IODINE

BACKGROUND OF THE INVENTION

The purpose of the present invention is to extract iodine from liquid effluents with the object of preparing it industrially or to eliminate it from the effluents which it pollutes.

Iodine is widely disseminated in nature and its industrial preparation, in particular, poses the problem of its concentration from aqueous solutions. The same problem is posed during its recovery, for economic reasons, from liquid effluents. It is likewise important to concentrate the radioactive iodine liberated during the treatment of nuclear fuels with the object of its recovery or its elimination by storage.

Different techniques for the concentration of the iodine contained in low doses in aqueous solutions have been described.

The dissolved iodine can be absorbed by porous bodies such as activated charcoal, zeolite, alumina, magnesia, silica gel, molecular sieves, or glass powder. The absorption power of these bodies can be very high when the solutions to be extracted are highly loaded with iodine, but is insufficient in the case in which these solutions contain very low iodine concentrations. This absorption power can be improved by the impregnation of the porous bodies with a metal or a metal salt which reacts with the iodine. Iodides are then formed and the elution thereof then presents difficulties (Nouveau Traité de Chimie Minerale (New Treatise of Mineral Chemistry) by Paul Pascal, edited by Masson, volume XVI, pp. 451 to 477).

Iodine in aqueous solution can be fixed on anion exchange resins (see Chemical Abstracts vol. 74, No. 8, reference 33 067). However, this fixation is possible only if the solutions do not contain anions apt to become preferentially fixed to the iodine on these resins. The regeneration of these resins transforms the fixed iodine into metallic iodide, necessitating an oxidation in order to recover the iodine.

The instant inventor in French Pat. No. 2,411,801, has disclosed a perfected procedure making it possible to fix the iodine in aqueous solution on resins possessing ethoxy groups having a non-ionic character, without retaining the acids or anions present in the solution, by preserving the iodine in the elementary state on the resin, with the possibility of eluting it either in the elementary state or in the combined form. The iodine is thus obtained in the concentrated form. However, this requires two operations, of which one is a fixation operation and the other is an elution operation.

Iodine could be obtained in the concentrated form in a single stage from aqueous solutions by liquid-liquid extraction, if the extraction power of the iodine solvents which are immiscible with water were adequate. However, the best known iodine solvents, such as carbon tetrachloride, chloroform, carbon disulfide, benzene, kerosene and tributyl phosphate, have a low iodine extraction power and this leads, on one hand, to the handling of large quantities of solvent in order to carry out the extraction and, on the other hand, results in iodine solutions which are very dilute.

SUMMARY OF THE INVENTION

The present invention makes it possible to extract uncombined elementary iodine from aqueous solutions by small quantities of solvents and to obtain the iodine in concentrated form in a single stage.

Briefly stated, the present invention comprises the process for the selective extraction of iodine from an aqueous solution containing the same, comprising adding to said solution as the iodine solvent a compound comprising ether groups, having a non-ionic hydrophobic character, of the general formula:

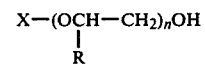

in which R is a methyl and/or ethyl group, n is a number from 1 to 200, and X is the remainder of an hydrophobic compound which comprises at least one reactive hydrogen atom.

DETAILED DESCRIPTION

The extraction of elementary iodine by the procedure of this invention is selective and can be carried out in the presence of strong acids such as sulfuric, nitric and hydriodic acid, and in the presence of salts such as sodium sulfate, sodium nitrate, sodium chloride, sodium bromide and potassium iodide.

The other halogens can likewise be extracted by the procedure of the invention, but bromine, chlorine and fluorine react with the extraction solvents and partially degrade them.

The procedure of the invention comprises extracting the iodine by solvents which are immiscible with water and possess ether groups, having a non-ionic hydrophobic character, of the type

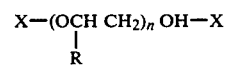

and R is a methyl and/or ethyl group, n is a number from 1 to 200, and X is the remainder of an hydrophobic compound which has at least one reactive hydrogen atom.

The compounds used in the procedure of the invention can thus be both propoxylated and butoxylated at the same time.

The propoxy or butoxy groups are linked to the remainder of a compound having a hydrophobic character, which includes one or more reactive hydrogen atoms, such as the monoalcohols, polyols, phenol, substituted phenols and carboxylic acids. Specific examples are propoxylated $C_{13}-C_{15}$ alcohols, propoxylated butanol, butoxylated butanol, propoxylated trimethylolpropane, and the like.

These compounds, used as solvents herein, are well known as base materials for the manufacture of polyurethane resins and foams as well as for the preparation of lubricants and hydraulic fluids and are described in particular in the book "Synthetic Lubricants" by REIGH C. GUNDERSON and ANDREW W. HART (Reinhold Publishing Corporation).

The extraction of the iodine from aqueous solutions by the solvents of the invention is performed by the known techniques of liquid-liquid extraction, in one or several stages.

The extractions according to the procedure of the invention can be carried out in the presence of a second solvent, such as chloroform or carbon tetrachloride which are miscible with the solvents of this invention and whose presence facilitates the separation of the phases. The addition of this second solvent can amount up to twice the amount of solvents according to the invention being used.

The iodine is recovered from the extraction solvent by known techniques like the evaporation of the iodine or the precipitation of insoluble iodides, and the solvent is recycled for a new extraction.

The procedure of the present invention, which makes it possible to obtain in the concentrated state the iodine which may be found in a very diluted state in certain aqueous solutions, can be integrated into the various techniques of industrial iodine manufacture. It makes it possible to extract the iodine from polluted effluents with the object of iodine recovery or of effluent purification.

The solvents possessing propoxy and/or butoxy groups can extract radioactive iodine; in particular, isotopes 129 and 131, from the iodine liberated during the treatment of nuclear fuels.

This extraction can be carried out under the conditions imposed by the treatment of the radioactive fuels, that is to say from aqueous nitric acid solutions.

The invention will be further described in connection with the following examples which are set forth for purposes of illustration only.

EXAMPLES 1 TO 4

One liter of aqueous solution containing a specified quantity of iodine and a quantity of potassium iodide double that of the iodine is agitated for 30 minutes with a $C_{13}$–$C_{15}$ alcohol having been propoxylated with 10 molecules of propylene oxide. Agitation is stopped and the two phases separate. The entire amount of potassium iodide and a part of the introduced iodine remain in the aqueous solution.

The quantity of iodine having been extracted, the quantity of iodine having been fixed per kilogram of solvent, and the percentage of iodine extracted with resepct to the quantity introduced are then calculated.

Under the conditions of this example, by varying the quantity of extraction solvent, the quantity of iodine and the quantity of potassium iodide which always remains equal to twice that of the iodine, the following results are obtained:

| Quantity of $C_{13}$–$C_{15}$ alcohol propoxylated with 10 molecules of propylene oxide | Quantity of iodine in the aqueous solution prior to extraction | Quantity of iodine extracted | Quantity of iodine fixed per kg of solvent | % of iodine extracted with respect to the iodine introduced |
|---|---|---|---|---|
| Ex. 1 | 1 g | 100 mg | 80 mg | 80 g | 80 |
| Ex. 2 | 10 g | 2.50 g | 2.49 g | 249 g | 99.6 |
| Ex. 3 | 10 g | 5.00 g | 4.94 g | 494 g | 98.8 |
| Ex. 4 | 10 g | 10.00 g | 8.73 g | 873 g | 87.3 |

EXAMPLES 5 TO 8

Under the conditions of Examples 1 to 4, extractions are carried out with a $C_{13}$–$C_{15}$ alcohol propoxylated with 20 molecules of propylene oxide.

The following results are obtained:

| Quantity of $C_{13}$–$C_{15}$ alcohol propoxylated with 20 molecules of propylene oxide | Quantity of iodine in the aqueous solution prior to extraction | Quantity of iodine extracted | Quantity of iodine fixed per kg of solvent | % of iodine extracted with respect to the iodine introduced |
|---|---|---|---|---|
| Ex. 5 | 1 g | 100 mg | 89 mg | 89 g | 89 |
| Ex. 6 | 10 g | 2.50 g | 2.49 g | 249 g | 99.6 |
| Ex. 7 | 10 g | 5.00 g | 4.87 g | 487 g | 97.4 |
| Ex. 8 | 10 g | 10.00 g | 8.90 g | 890 g | 89 |

EXAMPLES 9 TO 12

Under the conditions of Examples 1 to 4, extractions are carried out with butanol propoxylated with 30 molecules of propylene oxide.

The results are the following:

| Quantity of butanol propoxylated with 30 molecules of propylene oxide | Quantity of iodine in the aqueous solution prior to extraction | Quantity of iodine extracted | Quantity of iodine fixed per kg of solvent | % of iodine extracted with respect to the iodine introduced |
|---|---|---|---|---|
| Ex. 9 | 1 g | 100 mg | 84 mg | 84 g | 84 |
| Ex. 10 | 10 g | 2.50 g | 2.48 g | 248 g | 99.2 |
| Ex. 11 | 10 g | 5.00 g | 4.50 g | 450 g | 90 |
| Ex. 12 | 10 g | 10.00 g | 9.04 g | 904 g | 90.4 |

EXAMPLES 13 TO 16

Under the conditions of Examples 1 to 4, extractions are carried out with butanol propoxylated with 42 molecules of propylene oxide:

| Quantity of butanol propoxylated with 42 molecules of propylene oxide | Quantity of iodine in the aqueous solution prior to extraction | Quantity of iodine extracted | Quantity of iodine fixed per kg of solvent | % of iodine extracted with respect to the iodine introduced |
|---|---|---|---|---|
| Ex. 13 | 1 g | 100 mg | 83 mg | 83 mg | 83 |
| Ex. 14 | 10 g | 2.50 g | 2.45 g | 245 g | 98.0 |
| Ex. 15 | 10 g | 5.00 g | 3.98 g | 398 g | 79.6 |
| Ex. 16 | 10 g | 10.00 g | 8.54 g | 854 g | 85.4 |

EXAMPLES 17 TO 20

Under the conditions of Examples 1 to 4, extractions are carried out with trimethylolpropane propoxylated with 41 molecules of propylene oxide.

The following results are obtained:

| Quantity of trimethylolpropane propoxylated with 41 molecules of propylene oxide | Quantity of iodine in the aqueous solution prior to extraction | Quantity of iodine extracted | Quantity of iodine fixed per kg of solvent | % of iodine extracted with respect to the iodine introduced |
|---|---|---|---|---|
| Ex. 17 | 1 g | 100 mg | 65 mg | 65 g | 65 |
| Ex. 18 | 10 g | 2.50 g | 2.48 g | 248 g | 99.2 |
| Ex. 19 | 10 g | 5.00 g | 3.73 g | 373 g | 74.6 |
| Ex. 20 | 10 g | 10.00 g | 7.41 g | 741 g | 74.1 |

EXAMPLES 21 TO 24

Under the conditions of Examples 1 to 4, extractions are carried out with butanol butoxylated with 26 molecules of butylene oxide.

The results obtained are the following:

| | Quantity of butanol butoxylated with 26 molecules of butylene oxide | Quantity of iodine in the aqueous solution prior to extraction | Quantity of iodine extracted | Quantity of iodine fixed per kg of solvent | % of iodine extracted with respect to the iodine introduced |
|---|---|---|---|---|---|
| Ex. 21 | 1 g | 100 mg | 62 mg | 62 g | 62 |
| Ex. 22 | 10 g | 2.50 g | 2.46 g | 246 g | 99.2 |
| Ex. 23 | 10 g | 5.00 g | 4.88 g | 488 g | 97.6 |
| Ex. 24 | 10 g | 10.00 g | 7.21 g | 721 g | 72.1 |

EXAMPLES 25 TO 28

Under the conditions of Examples 1 to 4, extractions are carried out with butanol butoxylated with 170 molecules of butylene oxide.

The following results are obtained:

| | Quantity of butanol butoxylated with 170 molecules of butylene oxide | Quantity of iodine in the aqueous solution prior to extraction | Quantity of iodine extracted | Quantity of iodine fixed per kg of solvent | % of iodine extracted with respect to the iodine introduced |
|---|---|---|---|---|---|
| Ex. 25 | 1 g | 100 mg | 59 mg | 59 g | 59 |
| Ex. 26 | 10 g | 2.50 g | 2.32 g | 232 g | 92.8 |
| Ex. 27 | 10 g | 5.00 g | 2.08 g | 208 g | 41.6 |
| Ex. 28 | 10 g | 10.00 g | 1.86 g | 186 g | 18.6 |

EXAMPLES 28 TO 31

5 liters of a solution of 1,250 g of iodine (250 mg/l) in 3 N nitric acid are agitated for 30 minutes with 1 g of a propoxylated or butoxylated solvent. Agitation is stopped and the two phases separate. From the quantity of iodine remaining in the nitric acid solution, there is calculated the quantity of iodine having been extracted and the quantity of iodine having been fixed per kilogram of solvent.

Under the conditions of this example, by varying the nature of the extraction solvent, the following results are obtained:

| | Nature of the solvent | Quantity of iodine extracted | Quantity of iodine fixed per kg of solvent | % of iodine extracted with respect to the iodine introduced |
|---|---|---|---|---|
| Ex. 29 | $C_{13}$–$C_{15}$ alcohol propoxylated with 20 molecules of propylene oxide | 290 mg | 290 g | 23.2 |
| Ex. 30 | Butanol propoxylated with 30 molecules of propylene oxide | 330 mg | 330 g | 26.4 |
| Ex. 31 | Butanol butoxylated with 26 molecules of butylene oxide | 440 | 440 g | 35.2 |

EXAMPLES 32 AND 33

Under the conditions of Examples 29 to 31, extractions are carried out on 5 liters of solution containing 1,050 g of iodine (210 mg/l) in 1 N nitric acid.

The following results are obtained:

| | Nature of the solvent | Quantity of iodine extracted | Quantity of iodine fixed per kg of solvent | % of iodine extracted with respect to the iodine introduced |
|---|---|---|---|---|
| Ex. 32 | $C_{13}$–$C_{15}$ alcohol propoxylated with 20 molecules of propylene oxide | 460 mg | 460 g | 43.8 |
| Ex. 33 | Butanol propoxylated with 30 molecules of propylene oxide | 680 mg | 680 g | 65 |

EXAMPLES 34 AND 35

Under the conditions of Examples 29 to 31, extractions are carried out on 5 liters of solution containing 1,200 g of iodine (240 mg/l) in 3 N nitric acid in which 15 g of nitrogen dioxide ($NO_2$) have been dissolved.

The following results are obtained:

| | Nature of the solvent | Quantity of iodine extracted | Quantity of iodine fixed per kg of solvent | % of iodine extracted with respect to the iodine introduced |
|---|---|---|---|---|
| Ex. 34 | $C_{13}$–$C_{15}$ alcohol propoxylated with 20 molecules of propylene oxide | 250 mg | 250 g | 20.8 |
| Ex. 35 | Butanol propoxylated with 30 molecules of propylene oxide | 310 mg | 310 g | 25.8 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The process for the selective liquid-liquid extraction of iodine from an aqueous solution containing the same without forming a precipitate, comprising adding to said solution an iodine solvent comprising ether groups, having a non-ionic hydrophobic character, of the general formula:

$$X-(OCH-CH_2)_nOH$$
$$\quad\quad\quad |$$
$$\quad\quad\quad R$$

in which R is a methyl and/or  group, n is a number from 1 to 200, and X is the remainder of an hydrophobic compound which comprises at least one reactive hydrogen atom and recovering the iodine from the solvent.

2. The process of claim 1, in which the compound of hydrophobic character is an alcohol, a polyol, a phenol, a substituted phenol or a carboxylic acid.

3. The process of claim 2, in which the compound is a propoxylated $C_{13}$–$C_{15}$ alcohol, propoxylated butanol, propoxylated trimethylolpropane, butoxylated butanol.

4. The process of claim 1, in which the iodine to be extracted is radioactive iodine.

5. The process of claim 1, in which the iodine to be extracted consists of isotopes 129 and 131 liberated during the treatment of nuclear fuels.

6. The process of claim 1, in which the iodine-containing aqueous solution and said compound mixture is agitated for a time sufficient to give maximum extraction of iodine.

7. The process of claim 1 or 6 in which the compound is a $C_{13}$–$C_{15}$ alcohol propoxylated with 10 to 20 molecules of propylene oxide.

8. The process of claim 1 or 6 in which the compound is a propoxylated butanol or a butoxylated butanol.

* * * * *

UNITED STATES PATENT AND TRADEMARK OFFICE
CERTIFICATE OF CORRECTION

PATENT NO. : 4,388,231
DATED : June 14, 1983
INVENTOR(S) : Lucien Person

It is certified that error appears in the above-identified patent and that said Letters Patent are hereby corrected as shown below:

Column 3, line 44, "resepct" should be --respect--; and

Column 8, line 3, before "butoxylated", insert --or--.

Signed and Sealed this

Sixteenth Day of August 1983

[SEAL]

Attest:

GERALD J. MOSSINGHOFF

Attesting Officer   Commissioner of Patents and Trademarks